United States Patent
Wu et al.

(10) Patent No.: US 10,701,061 B2
(45) Date of Patent: Jun. 30, 2020

(54) METHODS FOR BLOCKING UNAUTHORIZED APPLICATIONS AND APPARATUSES USING THE SAME

(71) Applicant: VIA TECHNOLOGIES, INC., New Taipei (TW)

(72) Inventors: Guanghui Wu, Shanghai (CN); Jinglin Liu, Shanghai (CN)

(73) Assignee: VIA TECHNOLOGIES, INC., New Taipei (TW)

(*) Notice: Subject to any disclaimer, the term of this patent is extended or adjusted under 35 U.S.C. 154(b) by 212 days.

(21) Appl. No.: 15/707,486

(22) Filed: Sep. 18, 2017

(65) Prior Publication Data

US 2018/0332030 A1    Nov. 15, 2018

(30) Foreign Application Priority Data

May 10, 2017   (CN) .......................... 2017 1 0323921

(51) Int. Cl.
  *H04L 29/06*  (2006.01)
  *H04L 9/08*   (2006.01)
  (Continued)

(52) U.S. Cl.
  CPC .......... *H04L 63/0823* (2013.01); *G06F 21/44* (2013.01); *H04L 9/0861* (2013.01);
  (Continued)

(58) Field of Classification Search
  CPC . H04L 63/0823; H04L 9/3263; H04L 9/0894; H04L 9/321; H04L 9/0861; G06F 21/44; G06F 21/602; G06F 21/56
  See application file for complete search history.

(56) References Cited

U.S. PATENT DOCUMENTS 5,818,939 A * 10/1998 Davis ...................... G06F 21/72
                                            713/192
8,646,060 B1 * 2/2014 Ben Ayed ........... H04L 63/0853
                                            726/9
(Continued)

FOREIGN PATENT DOCUMENTS

CN        103517273 A    1/2014
CN        103685323 A    3/2014
(Continued)

OTHER PUBLICATIONS

Eskicioglu et al., "A key transport protocol based on secret sharing applications to information security", IEEE Transactions on Consumer Electronics, vol. 48 , Issue: 4 , Nov (Year: 2002).*
(Continued)

*Primary Examiner* — Morshed Mehedi
(74) *Attorney, Agent, or Firm* — McClure, Qualey & Rodack, LLP (57) ABSTRACT

The invention introduces a method for blocking unauthorized applications, at least containing: receiving an input parameter from an application; determining whether the application is authenticated by inspecting content of the input parameter; randomly generating a session key, storing the session key in a file and storing the file in a path that can be accessed by a motherboard support service and the application only when the application is authenticated; and replying with the path and a filename of the file to the application.

4 Claims, 11 Drawing Sheets

(51) Int. Cl.
*H04L 9/32* (2006.01)
*G06F 21/44* (2013.01)

(52) U.S. Cl.
CPC ......... *H04L 9/0894* (2013.01); *H04L 9/3263* (2013.01); *H04L 9/321* (2013.01)

(56) References Cited

U.S. PATENT DOCUMENTS

| | | | | |
|---|---|---|---|---|
| 2003/0196083 | A1* | 10/2003 | Grawrock | G06F 21/57 713/156 |
| 2005/0192099 | A1* | 9/2005 | Nguyen | G06F 21/10 463/42 |
| 2012/0131345 | A1* | 5/2012 | Dadu | G06F 21/105 713/176 |
| 2013/0340048 | A1* | 12/2013 | Sebastian | H04L 63/08 726/4 |
| 2018/0091313 | A1 | 3/2018 | Li et al. | |
| 2018/0114030 | A1* | 4/2018 | Sullivan | G06F 21/6218 |

FOREIGN PATENT DOCUMENTS

| | | |
|---|---|---|
| CN | 104219055 A | 12/2014 |
| CN | 105451231 A | 3/2016 |
| CN | 106059869 A | 10/2016 |
| CN | 106101097 A | 11/2016 |
| CN | 106357493 A | 1/2017 |
| CN | 106385679 A | 2/2017 |
| CN | 106452783 A | 2/2017 |
| TW | 200805081 A | 1/2008 |
| TW | 201702929 A | 1/2017 |
| WO | 2016/081837 A1 | 5/2016 |

OTHER PUBLICATIONS

Syta et al., "Keeping Authorities "Honest or Bust" with Decentralized Witness Cosigning", IEEE Symposium on Security and Privacy (SP), Date of Conference: May 22-26 (Year: 2016).*

* cited by examiner

METHODS FOR BLOCKING UNAUTHORIZED APPLICATIONS AND APPARATUSES USING THE SAME

CROSS REFERENCE TO RELATED APPLICATIONS

This application claims the benefit of China Patent Application No. 201710323921.5, filed on May 10, 2017, the entirety of which is incorporated by reference herein.

BACKGROUND

Technical Field

The present invention relates to computer security, and in particular, to methods for blocking unauthorized applications and apparatuses using the same.

Description of the Related Art

In a computer security context, hackers seek and exploit weaknesses in a computer systems and computer networks. Cooperation may be suffered from the attacks, and these attacks can damage computer services, breach security of customers' personal data, and cause loss of business revenue and reputation. In order to prevent a computer system from being attacked, it is desirable to have methods for blocking unauthorized applications and apparatuses using the same.

BRIEF SUMMARY

An embodiment of the invention introduces a method for blocking unauthorized applications, performed by a processing unit when loading and executing program code of a motherboard support service. The method comprises: receiving an input parameter from an application; determining whether the application is authenticated by inspecting the content of the input parameter; randomly generating a session key; storing the session key in a file and storing the file in a path that can be accessed by the motherboard support service and the application only when the application is authenticated; and replying with the path and a filename of the file to the application, thereby enabling the application to obtain the session key from the file and use the session key to encrypt and decrypt data between the motherboard support service and the application.

An embodiment of the invention introduces a method for blocking unauthorized applications, comprising: a processing unit of a first computer apparatus receives a request from a second computer apparatus, wherein the request comprises an electronic application comprising a version number and a customer ID (Identifier); the processing unit of the first computer apparatus generates a digital certificate by encrypting the electronic application using a private key, wherein the private key is associated with a public key stored in a nonvolatile memory of a motherboard and the motherboard is installed in an electronic apparatus outside of the first computer apparatus and the second computer apparatus; and the processing unit of the first computer apparatus replies by sending the digital certificate to the second computer apparatus.

An embodiment of the invention introduces an apparatus for blocking unauthorized applications, comprising a processing unit. The processing unit transmits a request to a server. The request comprises a digital certificate of an application. The processing unit reads a session key from a file in a directory. The processing unit encrypts communications data using the session key and transmits the encrypted communications data to the server after receiving an acknowledgement from the server.

An embodiment of the invention introduces an apparatus for blocking unauthorized applications, comprising a processing unit. The processing unit receives a request from a client. The request comprises the digital certificate of an application. The processing unit determines whether the request is legal by inspecting the digital certificate. The processing unit generates a session key, creates a file in a directory, obtains a UID (User Identifier) from the digital certificate, sets the access permission of the file that can be read by a process with the UID only, stores the session key in the file, and replies by sending an acknowledgement to the client when the request is legal.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
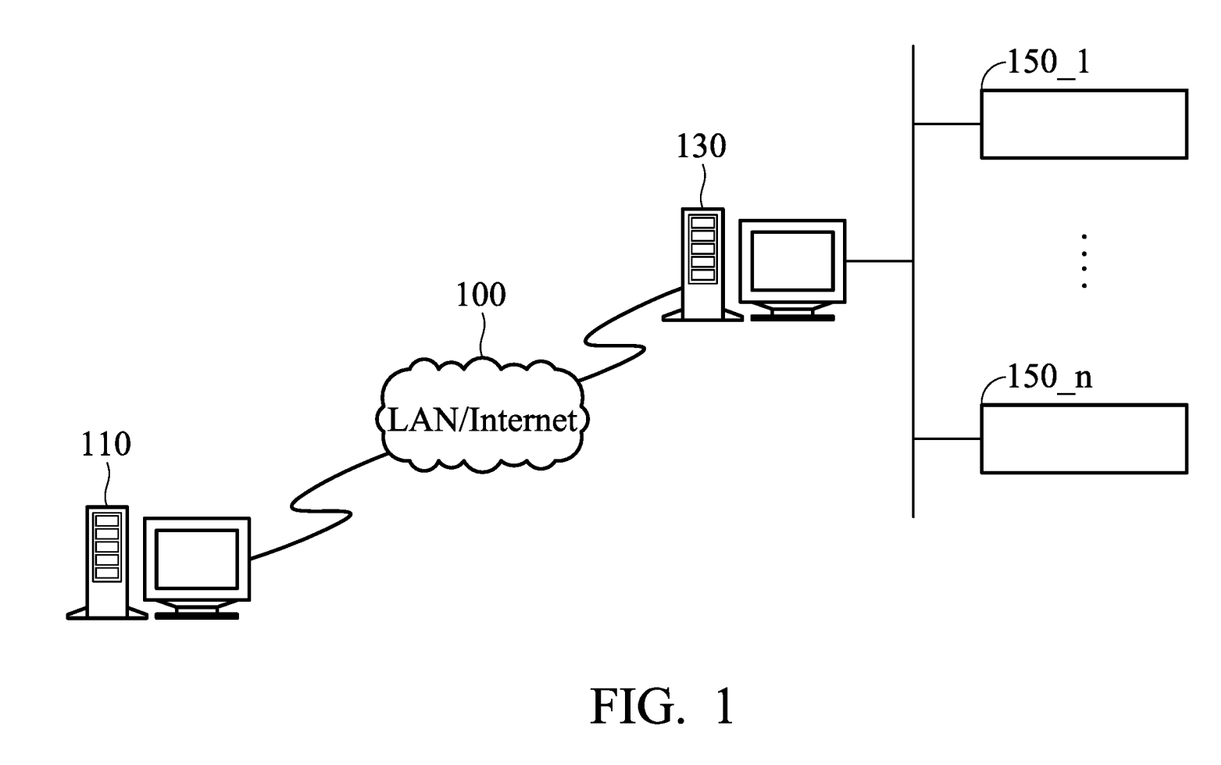
FIG. 1 is a schematic diagram of the network architecture according to an embodiment of the invention.

An embodiment of the invention introduces network architecture for manufacturing electronic equipment. FIG. 1 is a schematic diagram of the network architecture according to an embodiment of the invention. A motherboard manufacturer may write a board support service and a public key into non-volatile memories of motherboards 150_1 to 150_n, such as ROMs (Read-only Memories), EPROMs (Erasable Programmable Read Only Memories), flash memories, etc. The board support service is a driver library in a lower layer. When executing the board support service, a processing unit of the motherboard controls hardware devices that are connected to the motherboard. The motherboards 150_1 to 150_n may be assembled in a wide range of electronic equipment by equipment manufacturers, such as industrial PCs (Personal Computers), digital billboards, POS (Point-Of-Sale) systems, surveillance systems, IoT (Internet of Things) devices, etc. The industrial PC may be used for process control and/or measurement data acquisition. The digital billboard can be designed to display running text or different displays in time slots during one day. A POS system may contain a checkout station including an electronic cash drawer, a bar-code scanner, a credit card reader, a receipt or invoice printer, or any combination thereof. The POS system records each sale when it happens, so that the inventory records are always up-to-date. The surveillance system may contain a monitoring host and at least one surveillance camera. The surveillance camera may be a video camera used to observe an area and the monitoring host may include a recording device for recording and compressing the images captured by the surveillance camera and storing the compact videos in a searchable database. The IoT devices may be physical devices embedded with electronics, software, sensors, and connectivity to enable the devices to exchange data with the other connected devices. The IoT devices may allow devices to be sensed and controlled remotely across the network infrastructure. The IoT devices may be light control systems, smart TVs (televisions), access control systems, etc. A computer 130 of the equipment manufacturer may connect to a computer 110 of the motherboard manufacturer through LAN (Local Area Network) or Internet 100. The computer 130 may transmit a request including an electronic application to the computer 110. Next, the computer 130 obtains a digital certificate from the computer 110 and merges the digital certificate into an application manipulating the motherboard support service, which was developed by the equipment manufacturer. The application may be an Android App. The permission management of the file system of Android OS (Operating System) follows that of Linux OS. In Android OS, to guarantee the security, each application has a unique package name. When the application is running, each process of the application has a unique UID (User Identifier). Files created by a particular process are allowed to be accessed by an application having the corresponding package name. The computer 130 writes the applications individually including the digital certificate into the nonvolatile memories of the motherboards 150_1 to 150_n. In some embodiments, the computer 130 may not obtain the digital certificate from the computer 110 and write the applications individually containing no digital certificate into the nonvolatile memories of the motherboards.

Figure 2:
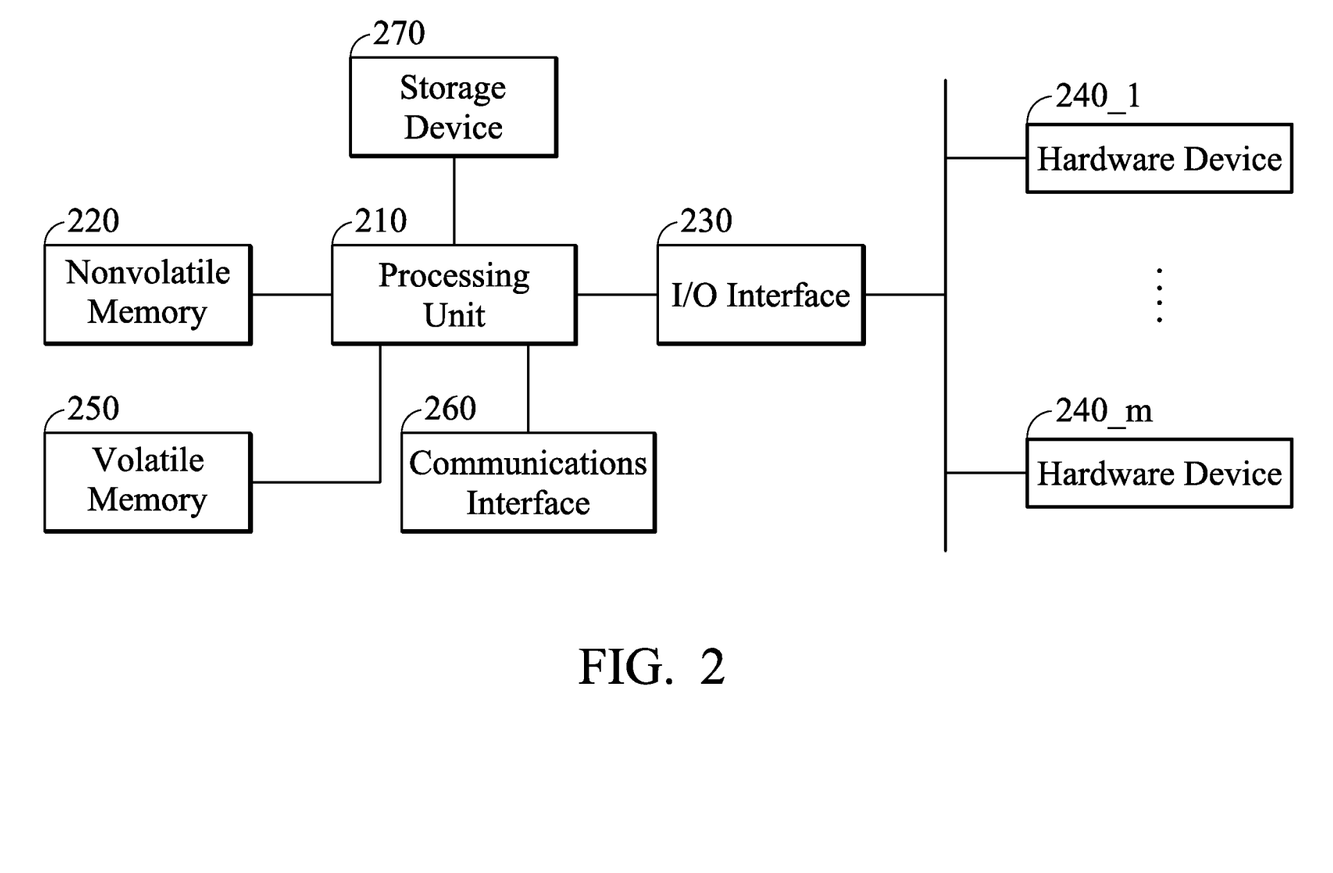
FIG. 2 is the system architecture of electronic equipment according to an embodiment of the invention.

FIG. 2 is the system architecture of electronic equipment according to an embodiment of the invention. The system architecture may be employed in an industrial PC, a digital billboard, a POS system, a surveillance system, an IoT device, an access control system and the like. The system architecture may contain a motherboard. At least a nonvolatile memory 220 and a processing unit 210 are disposed on the motherboard. The nonvolatile memory 22 may be a ROM, an EPROM, or a flash memory, for example. The processing unit 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a storage device 270 for storing a status database by the motherboard manufacturer before the motherboard is left from a factory. The status database is initiated to store a record containing a customer ID of zero and a version number of zero. In some other embodiments, the customer ID and the version number may be initiated to NULLs or other values representing initial statuses. It should be understood that the status database is stored in a directory that can be accessed by the motherboard support service only. The storage device 270 may be a hard drive, an optical drive, a SSD (Solid State Disk) or others. The storage device 270 may further allow the equipment manufacturer to store program code of applications and a digital certificate produced by the motherboard manufacturer. The system architecture further includes the volatile memory 250 for storing necessary data in execution, such as variables, data tables, data abstracts, or others. The processing unit 210 when loading and executing the motherboard support service may control any of the hardware devices 240_1 to 240_m or read data from any of the hardware devices 240_1 to 240_m through an I/O interface 230. The I/O interface 230 may be GPIO (General-Purpose Input/Output) interface. Any of the hardware devices 240_1 to 240_m is a display controller, a print controller, a real-time clock, a reboot watchdog timer, or others. A communications interface 260 is included in the system architecture and the processing unit 210 can thereby communicate with other electronic apparatuses. The communications interface 260 may be a LAN (Local Area Network) module, a WLAN (Wireless Local Area Network) module, a USB (Universal Serial Bus) module or others.

Figure 3:
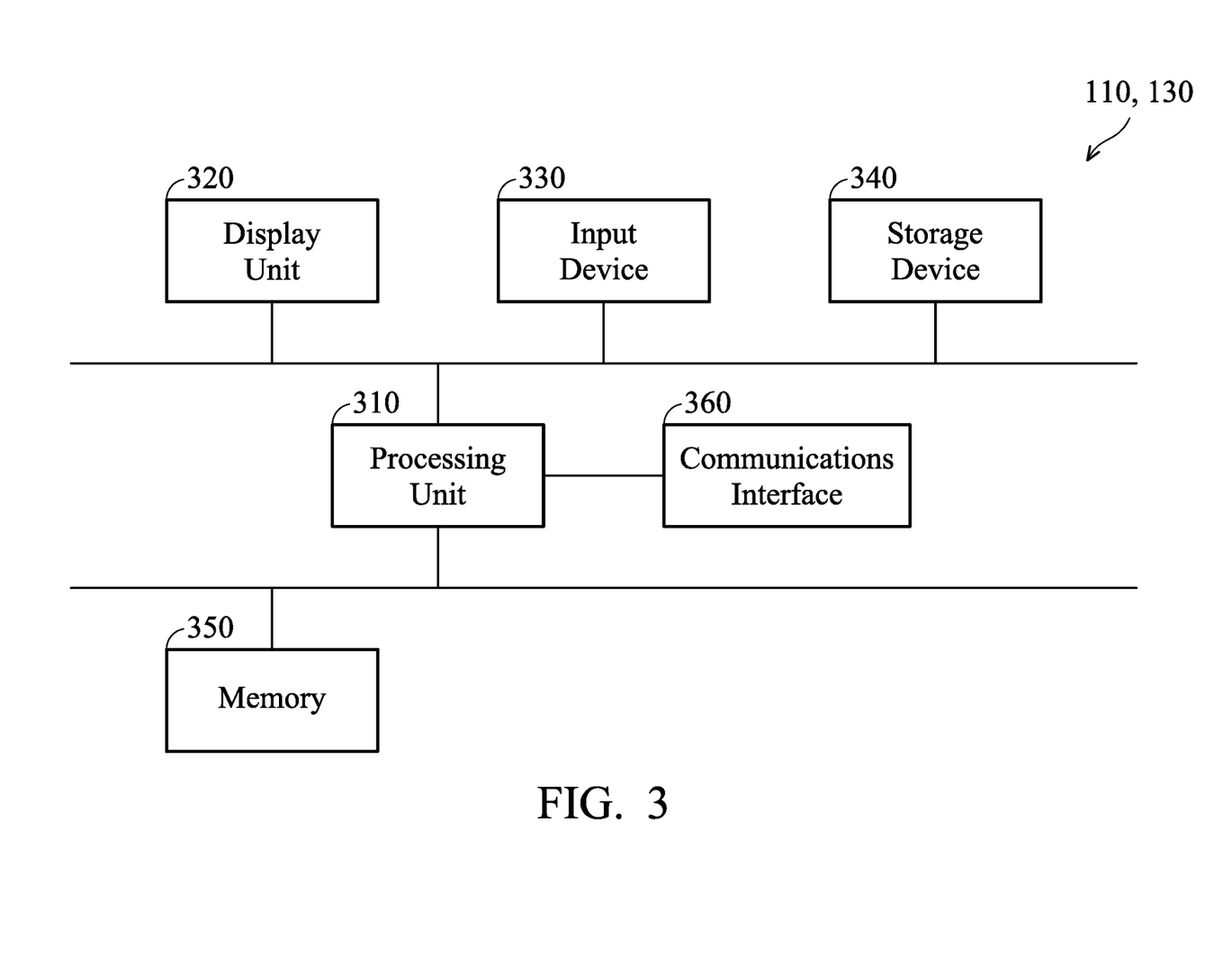
FIG. 3 is the system architecture of a computer apparatus according to an embodiment of the invention.

FIG. 3 is the system architecture of a computer apparatus according to an embodiment of the invention. The system architecture may be practiced in any of the computers 110 and 130 and the like with computations capacity, at least including a processing unit 310. The processing unit 310 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 350 for storing necessary data in execution, such as variables, data tables, data abstracts, or others, and a storage unit 340 for storing a wide range of electronic files. A communications interface 360 is included in the system architecture and the processing unit 310 can thereby communicate with other electronic apparatuses. The communications interface 360 may be a LAN module, a WLAN module, or others. The system architecture further includes one or more input devices 330 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 320, such as a TFT-LCD (Thin film transistor liquid-crystal display) panel, an OLED (Organic Light-Emitting Diode) panel, or another display unit, may also be included to display input letters, alphanumeric characters and symbols, dragged paths, drawings, or screens provided by an application for a user to view.

Figure 4:
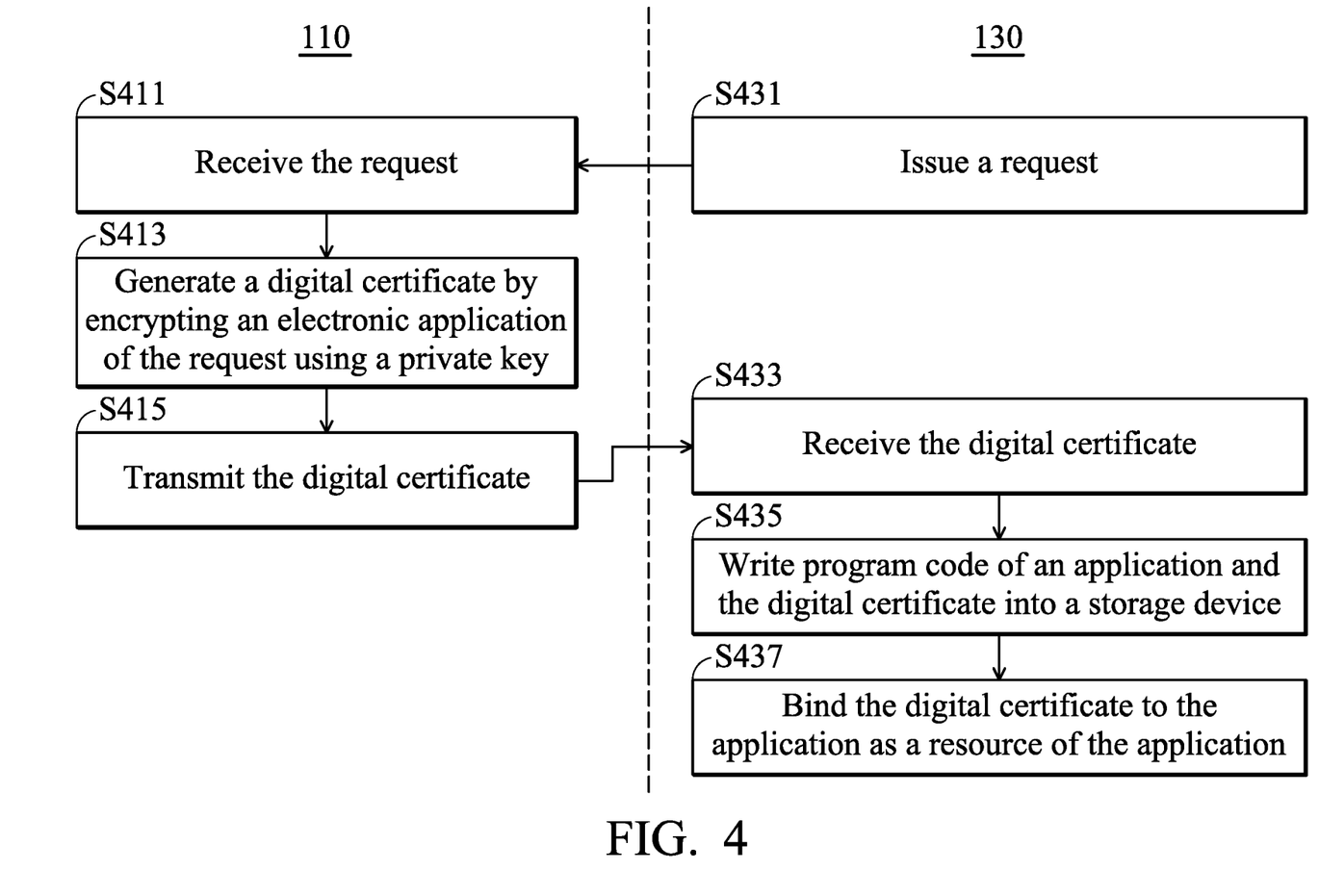
FIG. 4 is a flowchart illustrating a method for generating a digital certificate according to an embodiment of the invention.

To prevent unauthorized applications from using the motherboard support service, the motherboard manufacturer may provide a digital certificate to be merged into applications developed by an authorized equipment manufacturer. FIG. 4 is a flowchart illustrating a method for generating a digital certificate according to an embodiment of the invention. The method is performed by the computer 110 of the motherboard manufacturer in coordination with the computer 130 of the equipment manufacturer. The flowchart is separated by a dashed line, the left hand side illustrates steps that are performed when the processing unit 310 of the computer 110 loads and executes relevant program code and the right hand side illustrates steps that are performed when the processing unit 310 of the computer 130 loads and executes relevant program code. The method begins with an issuance of a request made by the processing unit 310 of the computer 130 to the computer 110 via the communications interface 360 of the computer 130 (step S431). The request contains an electronic application in a structured format that can be parsed by the computer 110, including information regarding a version number, a package name, a customer ID, an expiration date, etc. The structured format may be a one-dimensional array of fixed- or variable-length cells. The package name may conform to the naming rule for Android applications. Exemplary electronic applications are shown in Table 1 below.

TABLE 1

| Version number | 1 |
|---|---|
| Package name | com.example.demoapp |
| Customer ID | 1 |
| Expiration date | 2020 Dec. 31 |

After receiving the request via the communications interface 360 of the computer 110 (step S411), the processing unit 310 of the computer 110 generates a digital certificate by encrypting the electronic application of the request using a private key corresponding to the public key stored in nonvolatile memory 220 of the motherboard (step S413) and transmits the digital certificate to the computer 130 via the communications interface 360 of the computer 110 (step S415). It should be noted that the content encrypted by the private key can be decrypted by the public key. However, the decrypted content is garbled text that cannot be recognized when the public key does not match the private key. After receiving the digital certificate via the communications interface 360 of the computer 130 (step S433), the processing unit 310 of the computer 130 writes program code of an application and the digital certificate into the storage device 270 of the motherboard (step S435) and binds the digital certificate to the application as a resource of the application (step S437). In step S437, the processing unit 310 may use API (Application Programming Interface) provided by Android SDK platform to bind the digital certificate to the application.

Figure 5A:
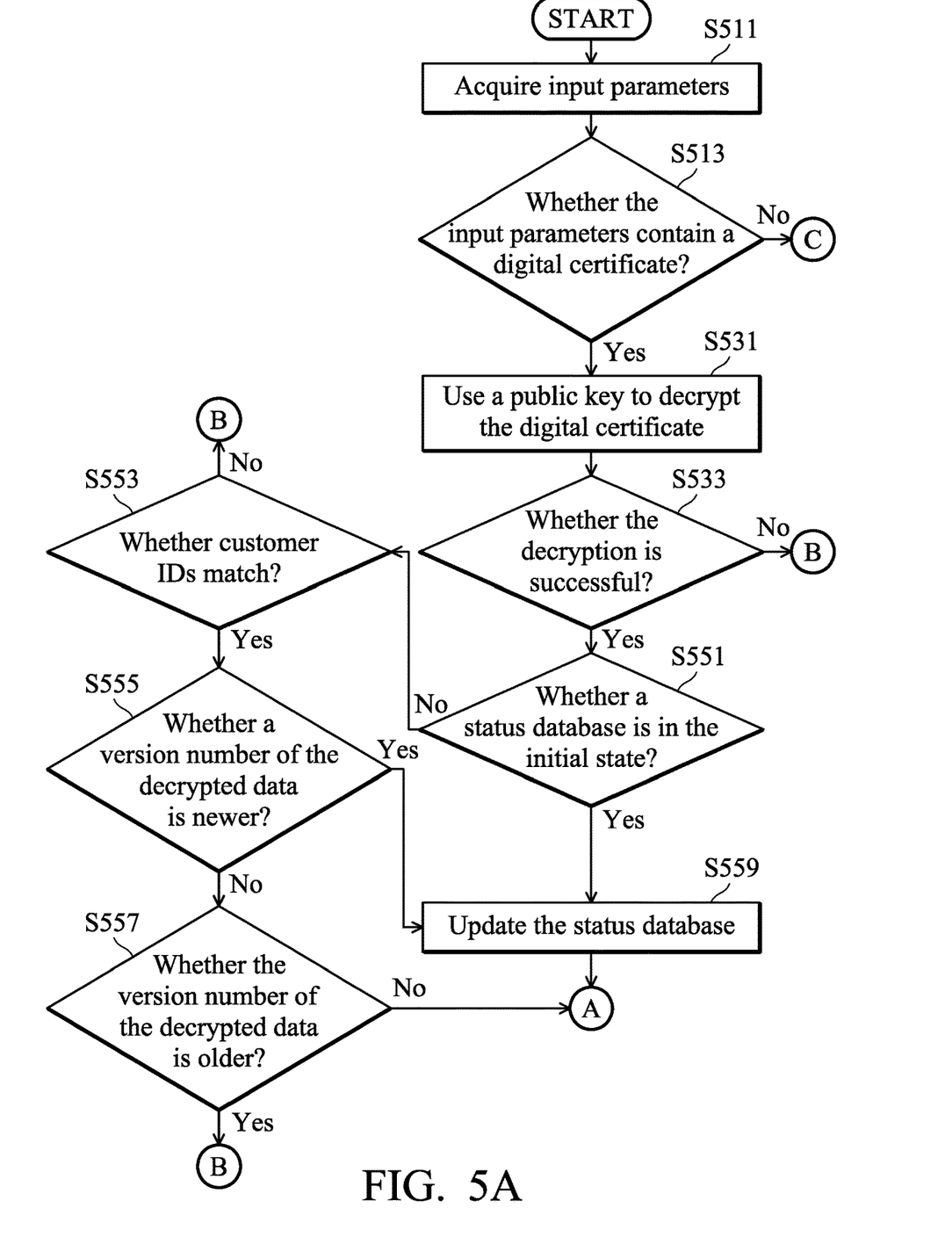
FIGS. 5A and 5B are flowcharts illustrating a method for blocking unauthorized applications that is performed by a processing unit when loading and executing program code corresponding to the initialization event of the motherboard support service according to an embodiment of the invention.
Figure 5B:
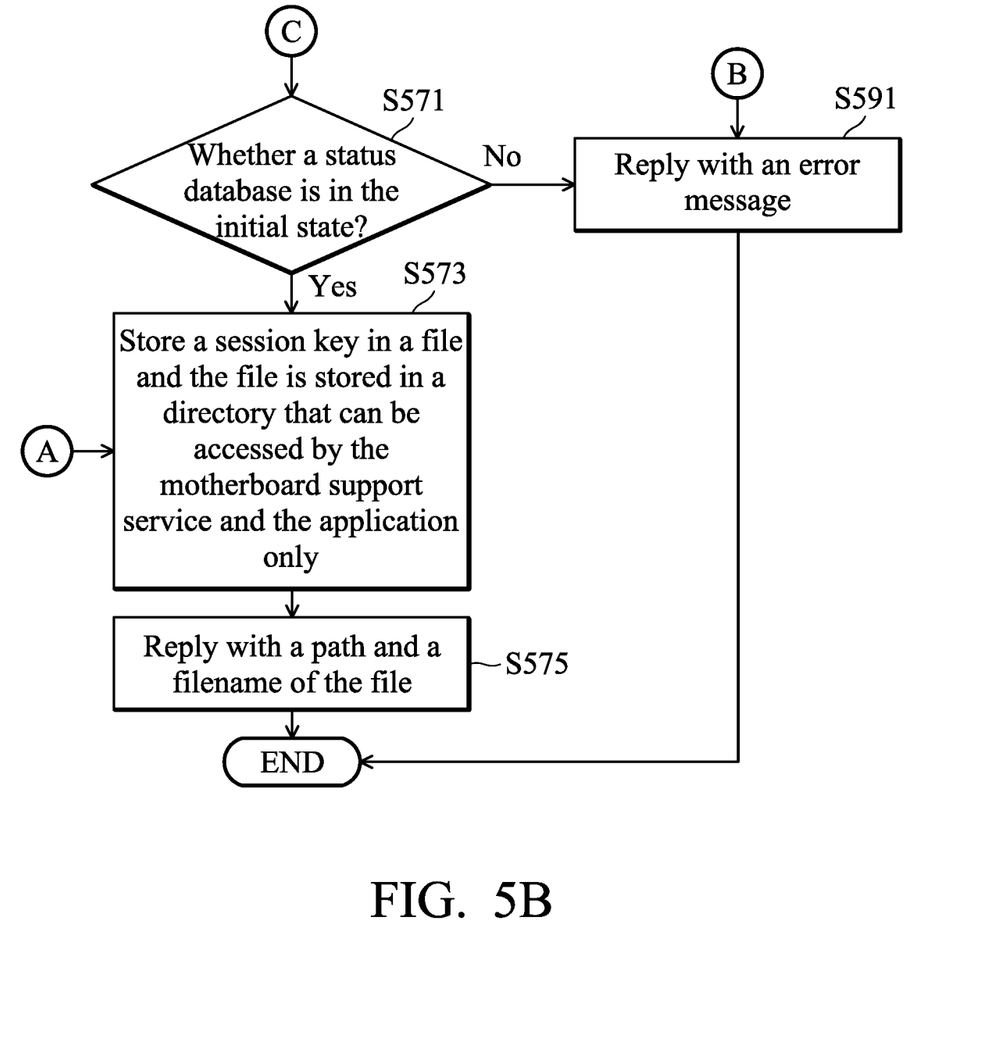

Before methods of the motherboard support service can be used by the application, the application needs to instantiate the motherboard support service and selectively provide the digital certificate. When the motherboard support service is instantiated, an initialization event is triggered. In the initialization event, the motherboard support service may perform a series of judgments for blocking unauthorized applications. FIGS. 5A and 5B are flowcharts illustrating a method for blocking unauthorized applications that is performed by the processing unit 210 when loading and executing program code corresponding to the initialization event of the motherboard support service according to an embodiment of the invention. The method begins with an acquisition of input parameters from an application (step S511) and a determination whether the input parameters contain a digital certificate (step S513). When the input parameters does not contain a digital certificate (the "no" path of step S513), the processing unit 210 determines whether the status database is in the initial state (step S571). In step S571, if the version number of the status database is in the initial state, then the status database is determined in the initial state. When the status database is in the initial state (the "yes" path of step S571), a session key of a predefined length is randomly generated, the session key is stored in a file and the file is stored in a directory that can be accessed by the motherboard support service and the application only (step S573), and then, the path and the filename of the file are replied to the application (step S575). In step S573, the motherboard support service may create a new file in a private folder of the directory "/data" and set a permission of this file that can be read by a process of a specified UID corresponding to this package name and store the session key in this file where the private folder corresponds to this package name and the UID is used to identify the process of the application that is running. It should be understood that, under a permission control by the file system, only the application with this package name can access arbitrary files of the private folder of the directory "/data". In addition, under the permission control by the file system, only the process with this UID can access this file. Thus, only the application that has passed a permission check by the file system can read the session key from the file and use the session key to encrypt data to be sent to the motherboard support service and to decrypt data received from the motherboard support service. When the status database is not in the initial state (the "no" path of step S571), the instantiation of the motherboard support service is aborted and an error message is sent to the application as a reply (step S591).

When the input parameters contain a digital certificate (the "yes" path of step S513), the computer 110 uses the public key stored in the nonvolatile memory 220 to decrypt the digital certificate (step S531), and then the computer 110 determines whether the decryption is successful (step S533). In step S533, if an electronic application, such as the ones shown in Table 1, can be parsed from the decrypted content, then the decryption is successful. Otherwise, the decryption fails. When the decryption fails (the "no" path of step S533), the instantiation of the motherboard support service is aborted and an error message is sent to the application in reply (step S591). When the decryption is successful (the "yes" path of step S533), a determination is made as to whether the status database is in the initial state (step S551).

When the status database is in the initial state (the "yes" path of step S551), the customer ID and the version number of the status database are updated with a customer ID and a version number of the digital certificate (step S559). Subsequently, the aforementioned steps S573 and S575 are performed. When the status database is not in the initial state (the "no" path of step S551), three judgments are performed: whether the customer ID of the decrypted data matches the customer ID stored in the status database (step S553); whether the version number of the decrypted data is newer than the version number stored in the status database (step S555); and whether the version number of the decrypted data is older than the version number stored in the status database (step S557). When the customer ID of the decrypted data does not match the customer ID stored in the status database (the "no" path of step S553), this means that the application may be an unauthorized application implanted by a hacker. Subsequently, the aforementioned step S591 is performed. When the customer ID of the decrypted data matches the customer ID stored in the status database but the version number of the decrypted data is older than the version number stored in the status database (the "yes" path of step S553 followed by the "no" path of step S555 followed by the "yes" path of step S557), this means that the application may be an older authorized application stolen by a hacker, and that the hacker may attempt to attack the electronic equipment through the stolen application. Subsequently, the aforementioned step S591 is performed. When the customer ID of the decrypted data matches the customer ID stored in the status database and the version number of the decrypted data is the same as the version number stored in the status database (the "yes" path of step S553 followed by the "no" path of step S555 followed by the "no" path of step S557), this means that the application is an authorized application. Subsequently, the aforementioned steps S573 and S575 are performed. When the customer ID of the decrypted data matches the customer ID stored in the status database and the version number of the decrypted data is newer than the version number stored in the status database (the "yes" path of step S553 followed by the "yes" path of step S555), this means that the application is an authorized application of a newer version. Subsequently, the aforementioned steps S559, S573 and S575 are performed.

The following introduces several scenarios to explain the method of FIGS. 5A and 5B: FIGS. 6A to 6F are schematic diagrams for authenticating applications according to embodiments of the invention. The application authentication is performed when the processing unit 210 loads and executes program code of the motherboard support service 610 and the application 630. Data exchanges as shown in FIGS. 6A to 6F may be referred to as IPC (Inter-Process Communication).

Figure 6A:
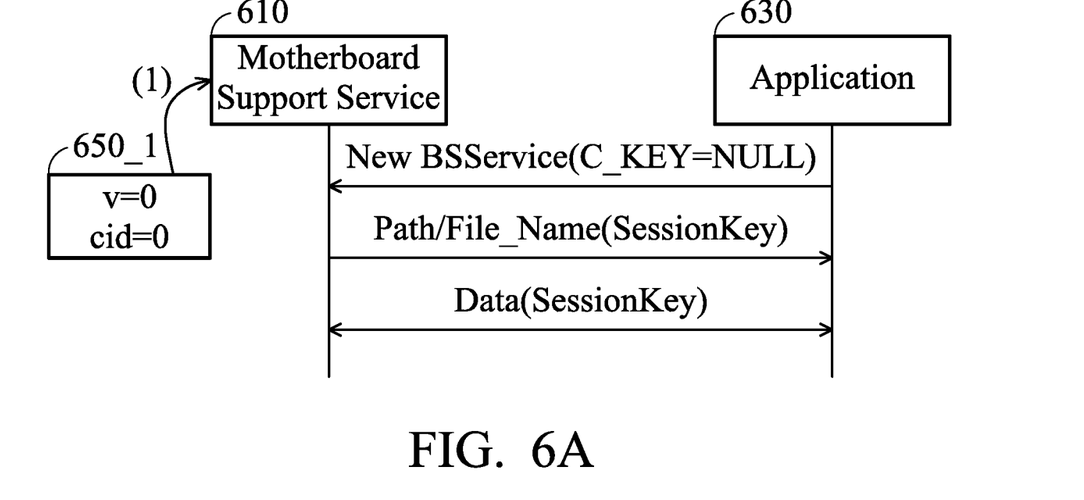
FIGS. 6A to 6F are schematic diagrams for authenticating applications according to embodiments of the invention.

Refer to FIG. 6A. Assume that the application developer has not applied for a digital certificate, and meanwhile, the status database 650_1 is in the initial state, for example, the version number is v=0 and the customer ID is cid=0: After receiving an instantiation request that does not contain a digital certificate "New BSService(C_KEY=NULL)" from the application 610, the motherboard support service 610 detects that the status database 650_1 is in the initial state (the "no" path of step S513 followed by the "yes" path of step S571). Subsequently, the motherboard support service 610 replies to the application 630 with a path and a file name of the storage device 270 "Path/File_Name(SessionKey)" for a file storing a session key (step S575). Therefore, the application 630 can read the session key from the file and use the session key to encrypt data to be transmitted to the motherboard support service 610 and decrypt data received from the motherboard support service 610.

Figure 6B:
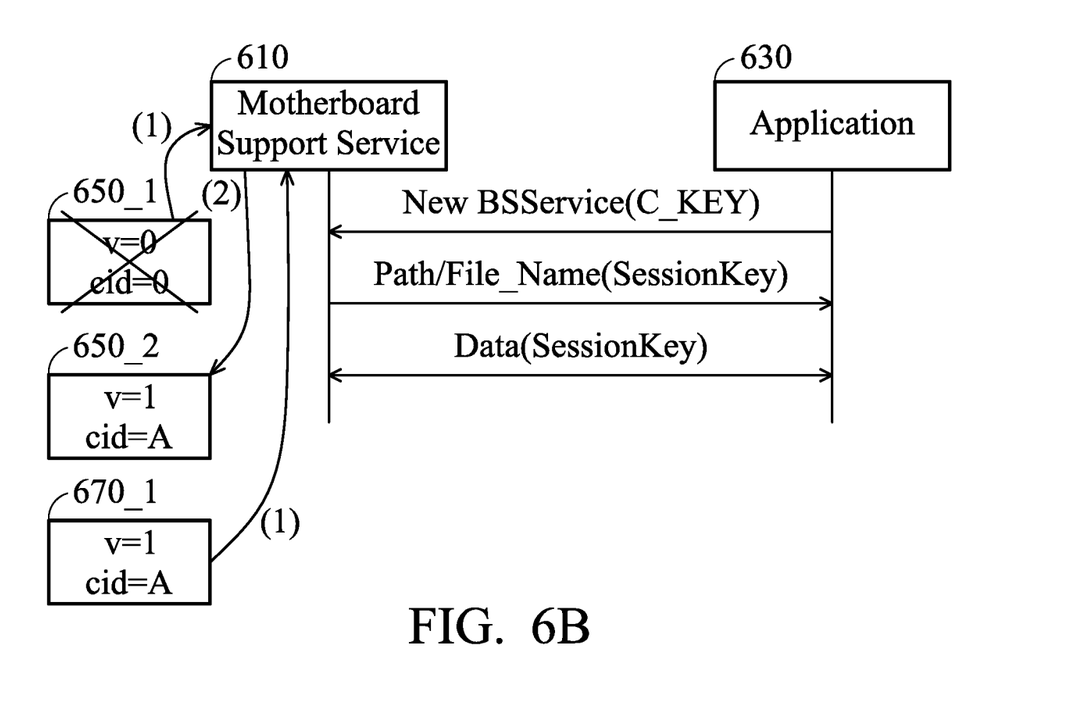

Refer to FIG. 6B. Assume that the application developer has applied for a digital certificate and use the motherboard support service 610 for the first time, and meanwhile, the status database 650_1 is in the initial state, for example, the version number v=0 and the customer ID is cid=0: After receiving an instantiation request "New BSService (C_KEY)" that contains a digital certificate 670_1, the motherboard support service 610 successfully decrypts the digital certificate 670_1 and detects that the status database 650_1 is in the initial state (the "yes" path of step S513 followed by the "yes" path of step S533 followed by the "yes" path of step S551). Subsequently, the motherboard support service 610 updates the version number and the customer ID of the status database 650_1 with v=1 and cid=A, respectively, (shown as the status database 650_2) (step S559) and replies to the application 630 with a path and a file name of the storage device 270 "Path/File_Name (SessionKey)" for a file storing a session key (step S575). Therefore, the application 630 can read the session key from the file and use the session key to encrypt data to be transmitted to the motherboard support service 610 and decrypt data received from the motherboard support service 610.

Figure 6C:
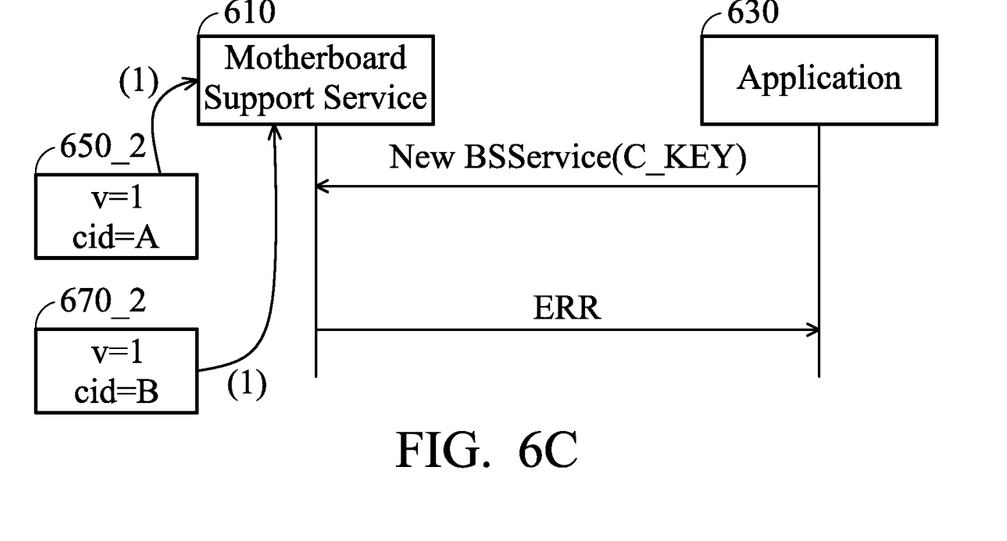

Refer to FIG. 6C. Assume that a hacker is pretending to be an application developer and is attempting to damage the electronic equipment via the motherboard support service 610, and meanwhile, the version number and the customer ID of the status database 650_1 are v=1 and cid=A: After receiving an instantiation request "New BSService (C_KEY)" that contains a digital certificate 670_2, the motherboard support service 610 successfully decrypts the digital certificate 670_2 and detects that the status database 650_1 is not in the initial state and the customer ID (cid=B) of the decrypted data does not match the customer ID (cid=A) of the status database 650_2 (the "yes" path of step S513 followed by the "yes" path of step S533 followed by the "no" path of step S551 followed by the "no" path of step S553). Subsequently, the motherboard support service 610 aborts the instantiation and replies to the application 630 with an error message ERR (step S591).

Figure 6D:
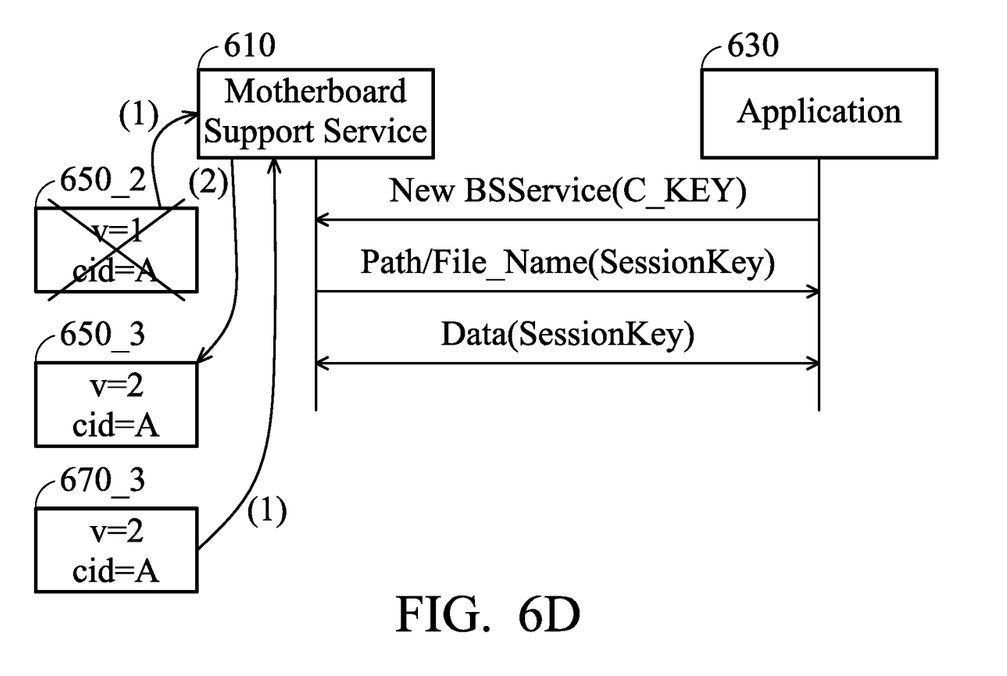

Refer to FIG. 6D. Assume that the application developer has updated a digital certificate with a newer version, and meanwhile, the version number of the status database 650_2 is v=1 and the customer ID of the status database 650_2 is cid=A: After receiving an instantiation request "New BSService(C_KEY)" that contains a digital certificate 670_3, the motherboard support service 610 successfully decrypts the digital certificate 670_3 and detects that the status database 650_2 is not in the initial state, the customer ID (cid=A) of the decrypted data matches the customer ID (cid=A) of the status database 650_2 and the version number (v=2) of the decrypted data is newer than the version number (v=1) of the status database 650_2 (the "yes" path of step S513 followed by the "yes" path of step S533 followed by the "no" path of step S551 followed by the "yes" path of step S553 followed by the "yes" path of step S555). Subsequently, the motherboard support service 610 updates the version number of the status database 650_2 with v=2, (shown as the status database 650_3) (step S559) and replies to the application 630 with a path and a file name of the storage device 270 "Path/File_Name(SessionKey)" for a file storing a session key (step S575). Therefore, the application 630 can read the session key from the file and use the session key to encrypt data to be transmitted to the motherboard support service 610 and decrypt data received from the motherboard support service 610.

Figure 6E:
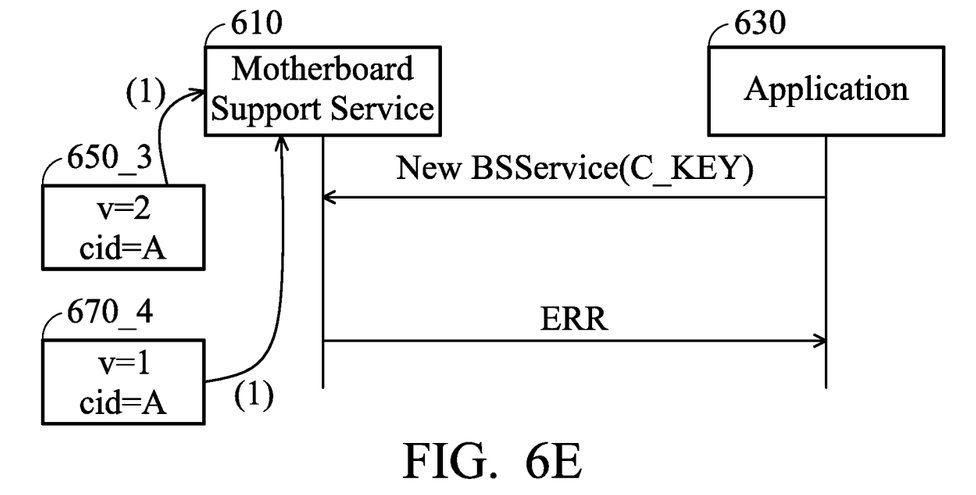

Refer to FIG. 6E. Assume that a hacker has stolen a digital certificate of an older version applied by an application developer and is attempting to damage the electronic equipment via the motherboard support service 610, and meanwhile, the version number and the customer ID of the status database 650_3 are v=2 and cid=A: After receiving an instantiation request "New BSService(C_KEY)" that contains a digital certificate 670_4, the motherboard support service 610 successfully decrypts the digital certificate 670_4 and detects that the status database 650_3 is not in the initial state and the customer ID (cid=A) of the decrypted data matches the customer ID (cid=A) of the status database 650_3 but the version number (v=1) of the decrypted data is older than version number (v=2) of the status database 650_3 (the "yes" path of step S513 followed by the "yes" path of step S533 followed by the "no" path of step S551 followed by the "yes" path of step S553 followed by the "no" path of step S555 followed by the "no" path of step S557). Subsequently, the motherboard support service 610 aborts the instantiation and replies to the application 630 with an error message ERR (step S591).

Figure 6F:
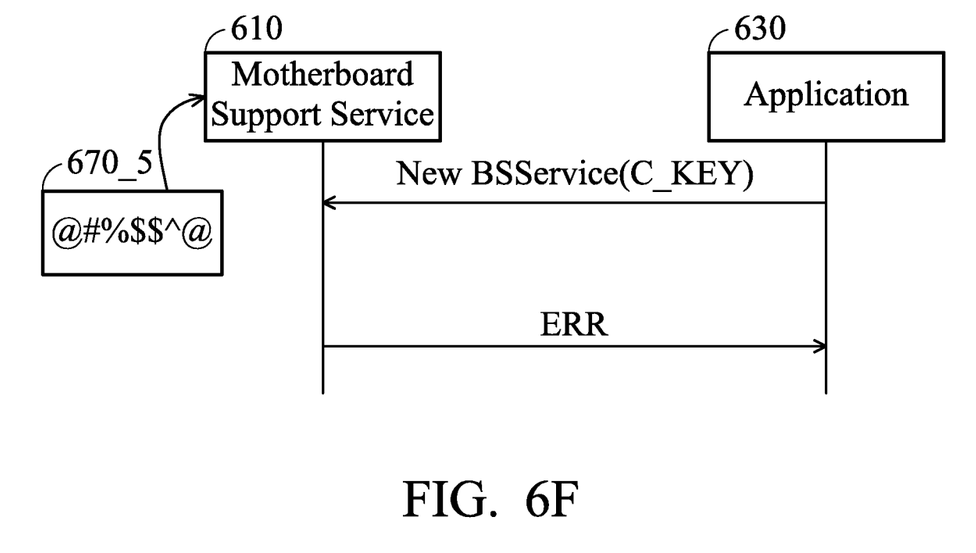

Refer to FIG. 6F. Assume that a hacker makes a fake digital certificate and attempts to damage the electronic equipment via the motherboard support service 610: After receiving an instantiation request "New BSService (C_KEY)" that contains a digital certificate 670_5, the motherboard support service 610 decrypts the digital certificate 670_5 and detects that the decryption is not successful (the "yes" path of step S513 followed by the "no" path of step S533). Subsequently, the motherboard support service 610 aborts the instantiation and replies to the application 630 with an error message ERR (step S591).

Figure 7:
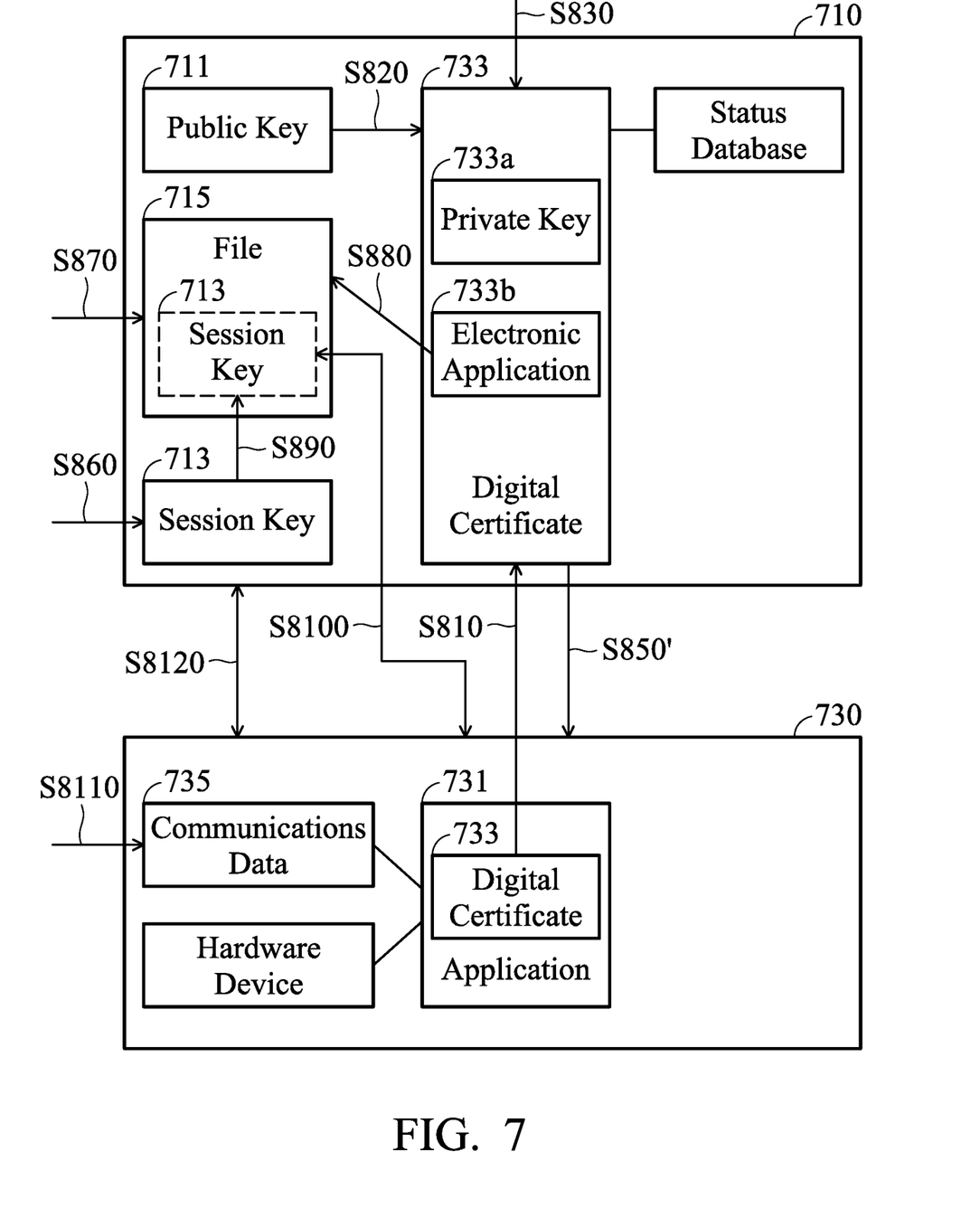
FIG. 7 is a block diagram illustrating an apparatus for blocking unauthorized applications according to an embodiment of the invention.
Figure 8:
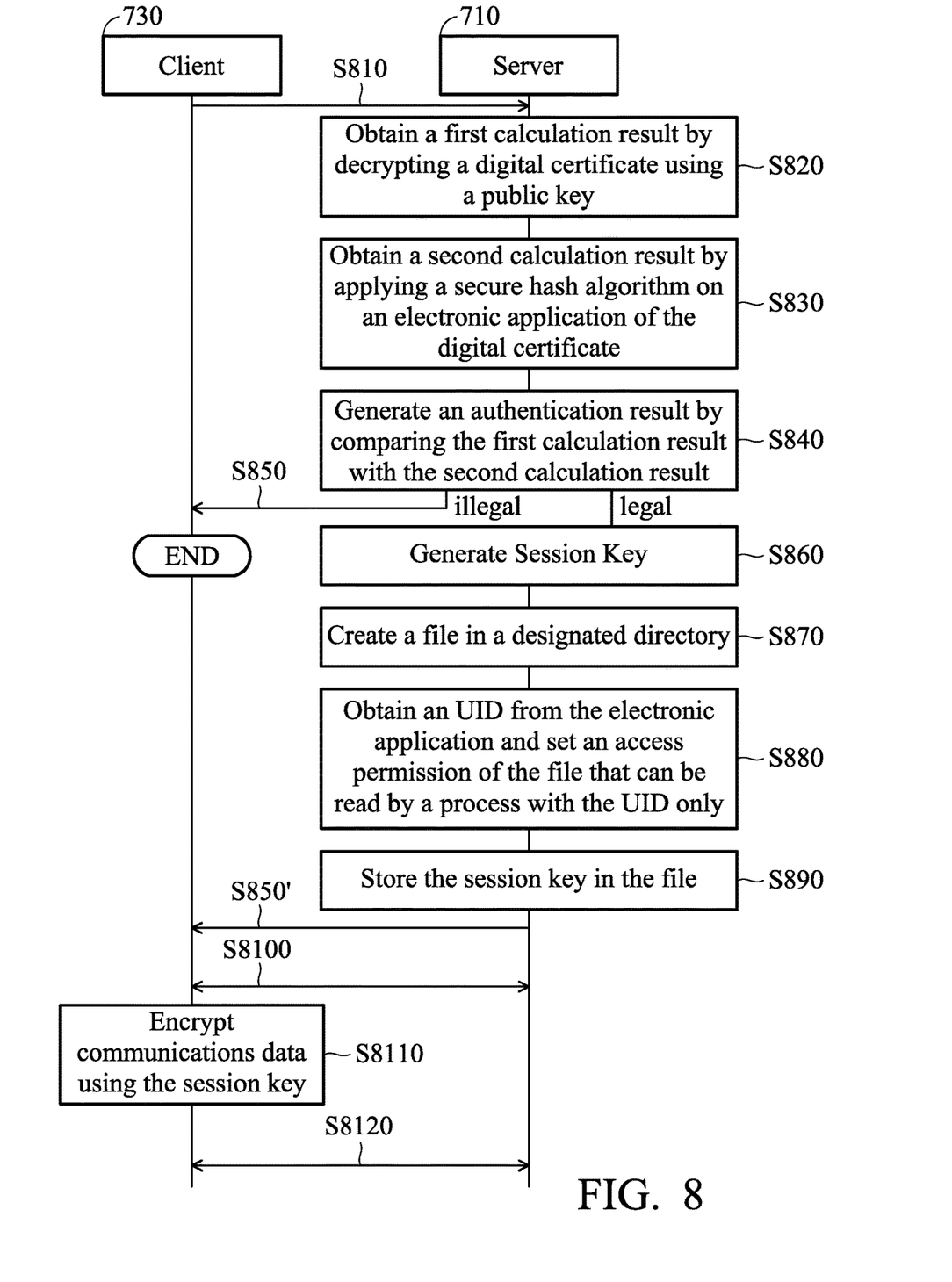
FIG. 8 is a flowchart illustrating a method for blocking unauthorized applications according to an embodiment of the invention.

FIG. 7 is a block diagram illustrating an apparatus for blocking unauthorized applications according to an embodiment of the invention. FIG. 8 is a flowchart illustrating a method for blocking unauthorized applications according to an embodiment of the invention. In an embodiment, an apparatus for blocking unauthorized applications may contain a server 710. In another embodiment, an apparatus for blocking unauthorized applications may contain a client 730. In the other embodiment, an apparatus for blocking unauthorized applications may contain the server 710 and the client 730. Any of the server 710 and the client 730 contains one or more processing units when loading and executing relevant software or firmware to perform the functionalities recited below. The server 710 stores a public key 711, the client 730 stores an application 731 and the application 731 contains a digital certificate 733. The server 710 receives a request containing the digital certificate 733 from the client 730 and the digital certificate 733 contains a private key 733a and an electronic application 733b (step S810). Subsequently, the server 710 obtains a first calculation result by decrypting the digital certificate 733 using the public key 711 (step S820) and a second calculation result by applying a secure hash algorithm, such as SHA-256 algorithm, on the electronic application 733b of the digital certificate 733 (step S830) and generates an authentication result by comparing the first calculation result with the second calculation result (step S840). If the first and second calculation results do not match, the request is illegal and the server 710 replies to the client 730 with a rejection, thereby enabling the client 730 to terminate execution of the application 731 (step S850). If the first and second calculation results match, the request is legal and the server 710 generates a session key 713 (step S860), creates a file 715 in a designated directory (step S870), obtains an UID from the electronic application 733b of the digital certificate 733, sets an access permission of the file 715 that can be read by a process with this UID only (step S880), stores the session key 713 in the file 715 (step S890) and replies with an acknowledgment to the client 730 (step S850'). The client 730 reads the session key 713 of the file 715 in the designated directory (step S8100) and encrypts communications data 735 using the session key 713 (step S8110). The communications data 735 transceived between the client 730 and the server 710 is encrypted (step S8120).

Embodiments of the invention introduce methods for blocking unauthorized applications and apparatuses using the same to integrate a digital certificate into an application developed by an equipment manufacturer. Each time the application request for operating the motherboard support service, the motherboard support service inspects whether the digital certificate is legal. When the request is illegal, the application is blocked from operating the motherboard support service to avoid the hardware from being attacked.

Although the embodiment has been described as having specific elements in FIGS. 2 and 3, it is noted that additional elements may be included to achieve better performance without departing from the spirit of the invention. While the process flows described in FIGS. 4, 5A, 5B and 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for blocking unauthorized applications, comprising:
   receiving, by a processing unit of a first computer apparatus, a request from a second computer apparatus, wherein the request comprises an electronic application comprising a version number and a customer ID (Identifier);
   generating, by the processing unit of the first computer apparatus, a digital certificate by encrypting the electronic application using a private key, wherein the private key is associated with a public key stored in a nonvolatile memory of a motherboard and the motherboard is installed in an electronic apparatus outside of the first computer apparatus and the second computer apparatus;
   replying, by the processing unit of the first computer apparatus, with the digital certificate to the second computer apparatus;
   receiving, by a processing unit on the motherboard that is executing program code of a motherboard support service, an input parameter from an application;
   determining, by the processing unit on the motherboard, whether the application is authenticated by inspecting the content of the input parameter;
   randomly generating, by the processing unit on the motherboard, a session key, storing the session key in a file and storing the file in a path that is accessed by the motherboard support service and the application only when the application is authenticated; and replying, by the processing unit on the motherboard, with the path and a filename of the file to the application, so that the application obtains the session key from the file and uses the session key to encrypt and decrypt data between the motherboard support service and the application.

2. The method of claim 1, further comprising:

receiving, by a processing unit of the second computer apparatus, the digital certificate from the first computer apparatus;

writing, by the processing unit of the second computer apparatus, program code of an application and the digital certificate into a storage device of the motherboard; and binding, by the processing unit of the second computer apparatus, the digital certificate to the application as a resource of the application.

3. The method of claim 1, wherein the step for storing, by the processing unit on the motherboard, the session key in a file and storing the file in a path of a storage device that is accessed by the motherboard support service and the application only comprises:

creating, by the processing unit on the motherboard, the file in a private folder corresponding to a package name of the application;

setting, by the processing unit on the motherboard, a permission of the file that is read by a process of a UID (User Identifier) corresponding to the package name; and storing, by the processing unit on the motherboard, the session key in the file.

4. The method of claim 1, wherein the first computer apparatus connects to the second computer apparatus through a LAN (Local Area Network) or the Internet.

* * * * *